(12) United States Patent
Reid

(10) Patent No.: US 6,403,249 B1
(45) Date of Patent: Jun. 11, 2002

(54) HUMIDIFICATION OF A PEM FUEL CELL BY AIR-AIR MOISTURE EXCHANGE

(75) Inventor: Ronald M. Reid, McKinleyville, CA (US)

(73) Assignee: Humboldt State University Foundation, Arcata, CA (US)

( * ) Notice: Subject to any disclaimer, the term of this patent is extended or adjusted under 35 U.S.C. 154(b) by 0 days.

(21) Appl. No.: 09/552,956

(22) Filed: Apr. 20, 2000

Related U.S. Application Data
(60) Provisional application No. 60/175,654, filed on Jan. 12, 2000.

(51) Int. Cl.[7] .................................................. H01M 2/14
(52) U.S. Cl. ............................. 429/39; 429/38; 429/34; 429/26; 429/13; 429/12
(58) Field of Search ............................. 429/12, 13, 26, 429/34, 38, 39

(56) References Cited

U.S. PATENT DOCUMENTS

| | | | | |
|---|---|---|---|---|
| 5,853,910 A | * | 12/1998 | Tomioka et al. | 429/17 |
| 5,879,826 A | * | 3/1999 | Lehman et al. | 429/13 |
| 6,284,399 B1 | * | 9/2001 | Oko et al. | 429/19 |

* cited by examiner

*Primary Examiner*—Gabrielle Brouillette
*Assistant Examiner*—Angela J. Martin
(74) *Attorney, Agent, or Firm*—McCutchen, Doyle, Brown & Enersen

(57) ABSTRACT

An apparatus and method for humidifying a fuel cell flows moisture-containing fuel cell exhaust against a first side of a humidification membrane. A second side of the humidification membrane is in physical contact with the inlet air flow. Moisture from the exhaust air is transferred across the humidification membrane to the inlet air flow. The humidified inlet air flow conveys moisture to the power section of the fuel cell. In this manner, fuel cell components requiring humidification, for example a proton exchange membrane, are prevented from becoming dehydrated and inoperable.

14 Claims, 6 Drawing Sheets

HUMIDIFICATION OF A PEM FUEL CELL BY AIR-AIR MOISTURE EXCHANGE

CROSS REFERENCE TO RELATED APPLICATION

This nonprovisional patent application claims priority from the United States Provisional Patent Application 60/175,654, filed Jan. 12, 2000, having the same title as the present application.

BACKGROUND OF THE INVENTION

1. Field of the Invention

The present invention relates to humidification of a fuel cell, and in particular, to a structure and method for humidifying a fuel cell wherein humid exhaust air from the cell is exposed to one side of a humidification membrane whose other side is on contact with the flow of inlet air into the cell. Contact between the inlet air flow and the humidification membrane moistens the inlet air flow, thereby preventing dehydration of the fuel cell.

2. Description of the Related Art

The present invention relates to electrochemical fuel cells and a method of operating electrochemical fuel cells. A fuel cell generates electricity by carefully directing the flow of electrons involved in the catalyzed reaction of hydrogen and oxygen to form water. Electrochemical fuel cells convert fuel and an oxidant to electricity and a reaction product. A typical fuel cell consists of a cathode, an anode, and an electrolyte. The electrolyte is sandwiched between the cathode and anode. Fuel, in the form of hydrogen, is supplied to the anode where a catalyst (usually platinum) catalyzes the following reaction:

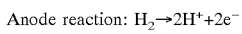

Anode reaction: $H_2 \rightarrow 2H^+ + 2e^-$

Hydrogen separates into hydrogen cations and electrons. The cations (protons) migrate through the electrolyte membrane to the cathode. The electrons migrate via an external circuit in the form of electricity.

An oxidant, typically oxygen or oxygen-containing air, is supplied to the cathode where it reacts with hydrogen cations that have crossed the proton exchange membrane and electrons from an external circuit. This reaction produces water and is also usually catalyzed by platinum and occurs as follows:

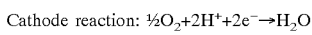

Cathode reaction: $\frac{1}{2}O_2 + 2H^+ + 2e^- \rightarrow H_2O$

Thus the fuel cell generates both electricity and water through the electrochemical reaction.

While some types of fuel cells employ a liquid electrolyte, the proton exchange membrane (PEM) fuel cell relies on a polymeric membrane to serve as its electrolyte. When hydrated, the polymeric proton exchange membrane possesses acidic properties which allow the membrane to conduct protons from the anode to the cathode of the fuel cell. However, if the proton exchange membrane is not sufficiently humidified, its resistance to the flow of protons increases, the electrochemical reaction occurring in the fuel cell can no longer be supported at a sufficient state, and the output current decreases or, in the worst case, stops.

If a PEM fuel cell is designed to draw its oxygen from a flow of oxygen-containing air, the inlet air flow rate will generally evaporate water from the region containing the proton exchange membrane more quickly than water is generated by the fuel cell. For this reason, PEM fuel cells commonly incorporate an element to humidify the incoming air stream.

A number of fuel cell humidification structures and techniques have been proposed.

U.S. Pat. No. 5,879,826 is entitled "Proton Exchange Membrane Fuel Cell" ("the '826 Patent") and issued on Mar. 9, 1999. The '826 Patent describes a PEM fuel cell design featuring a humidification manifold. The '826 Patent is hereby incorporated by reference.

The technique of the '826 Patent is to flow inlet air across a first side of a humidification membrane, with the second side of the membrane exposed to a flow of liquid water. The humidification membrane is impermeable to the liquid water flow, but is continually rehydrated by contact with liquid water on the second side as the continuous flow of dry inlet air evaporates water from the first side.

Because heat is also generated during the electrochemical reaction within the fuel cell, most fuel cells also incorporate a cooling element to maintain temperature within a range optimum for efficiency. In the fuel cell described by '826 Patent, the same liquid water supply is utilized both for humidification and cooling. Thus separate structures for humidification and cooling are not required. Another advantage is that humidification of the fuel cell takes place at approximately the operating temperature of the fuel cell.

While the approach of the '826 Patent works well, it possesses some disadvantages.

One disadvantage is that coupling of humidification and cooling functions precludes protection against freezing. This is because exposure of the humidification membrane to an ethylene glycol antifreeze mixture could degrade the relatively thin and fragile humidification membrane, or could allow constituents of the anti-freeze to be carried into and thereby poison the power section of the fuel cell.

Therefore, there is a need in the art for a humidified fuel cell which incorporates freeze protection.

A second disadvantage of the approach of the '826 Patent is the complexity of the resulting fuel cell structure. The fuel cell of the '826 Patent requires a flow of liquid water into the device. Such a liquid water flow may be unnecessary if cooling is provided by air rather than by water. Therefore, there is a need in the art for a humidified, air-cooled fuel cell.

A third disadvantage of the '826 Patent is the necessity of sealing the humidification manifold against the leakage of liquid water. This is necessary because the liquid water is introduced into the fuel cell under pressure in order to provide for constant circulation of coolant. The need to seal the humidification manifold further complicates design and fabrication of the fuel cell. Therefore, there is a need in the art for a humidified, air-cooled PEM fuel cell having a simple and rugged structure.

Another approach to fuel cell humidification is set forth in U.S. Pat. No. 5,853,910, entitled "FUEL CELL POWER GENERATING APPARATUS AND OPERATION METHOD THEREFOR" ("the '910 Patent"), which issued to Tomioka et al. on Dec. 29, 1998. During operation of the fuel cell proposed by the '910 Patent, moisture-containing exhaust of the fuel cell is conveyed through an air discharge passage and recirculated through the fuel cell via a circulation passage and an air introduction passage. In this manner, the fuel cell exhaust is reintroduced directly to the inlet air flow, thereby preventing dehydration of the proton exchange membrane with moisture present in the exhaust.

The '910 Patent also possesses some important disadvantages.

One disadvantage is that the humidification approach of the '910 Patent will adversely impact the power output of the fuel cell. Specifically, the purpose of the fuel cell is to generate electricity by causing reaction between hydrogen and oxygen present in the inlet air flow. Because the '910 Patent proposes to reintroduce oxygen-depleted exhaust directly into the inlet airflow, the design of the '910 Patent effectively dilutes the flow of oxygen into the fuel cell and thereby limits the maximum power output by the fuel cell.

Therefore, there is a need in the art for a humidified fuel cell whose power output is not adversely affected by the humidification process.

Another disadvantage of the '910 Patent is that it calls for active regulation of an airflow valve by a central processing unit. Apart from the additional expense required by such a valve and controller apparatus, the actively-regulated humidification system of the fuel cell of the '910 Patent would require regular calibration and maintenance.

Therefore, there is a need in the art for a humidified fuel cell involving an effective and passive humidification system.

SUMMARY OF THE INVENTION

The present invention teaches a structure and method for humidifying a fuel cell wherein moisture-containing exhaust from the fuel cell transfers moisture to a first side of a humidification membrane. The second side of the humidification membrane is in contact with the inlet air flow. The inlet air flow receives water from the humidification membrane, and subsequent exposure of the proton exchange membrane to this humidified inlet air flow prevents dehydration of the proton exchange membrane without adversely affecting the power output of the cell.

A first embodiment of a fuel cell structure in accordance with the present invention comprises an inlet receiving an inlet oxidant gas flow, a humidification membrane including a first side and a second side, and a first humidification plate receiving the inlet oxidant gas flow and passing the inlet oxidant gas flow across the first side of the humidification membrane. A power section receives the inlet oxidant gas flow from the first humidification plate and passes the inlet oxidant gas flow across one side of a proton exchange membrane to create an exhaust gas flow enriched in water. A second humidification plate receives the exhaust gas flow from the power section and passes the exhaust gas flow across the second side of the humidification membrane, such that moisture from the exhaust gas flow is transferred across the humidification membrane to the inlet oxidant gas flow.

A first embodiment of a method for humidifying a fuel cell in accordance with the present invention comprises the steps of contacting an inlet oxidant gas flow with a first side of a humidification membrane, causing an electrochemical reaction to transform the inlet oxidant gas flow into a moisture-containing exhaust gas flow, and contacting the exhaust gas flow with a second side of the humidification membrane, such that moisture from the exhaust gas flow is transferred across the humidification membrane to the inlet oxidant gas flow.

The features and advantages of the present invention will be understood upon consideration of the following detailed description of the invention and the accompanying drawings.

DETAILED DESCRIPTION

The present invention relates to a structure and method for humidifying a fuel cell, wherein moisture-containing exhaust from the power section is carried back to a humidification section in an internal manifold. This internal manifold maintains temperature of the exhaust and thereby minimizes condensation. The moist exhaust air is contacted with one side of a humidification membrane present in the humidification section. The other side of the humidification membrane is in physical contact with the dry inlet air flow.

Moisture in the exhaust air flow is transferred across the humidification membrane to the inlet air flow, which in turn conveys this moisture back to the power section of the fuel cell. Once the exhaust air has surrendered its moisture to the humidification membrane, the exhaust air exits the fuel cell. In this manner, dehydration of the fuel cell is prevented.

Figure 1:
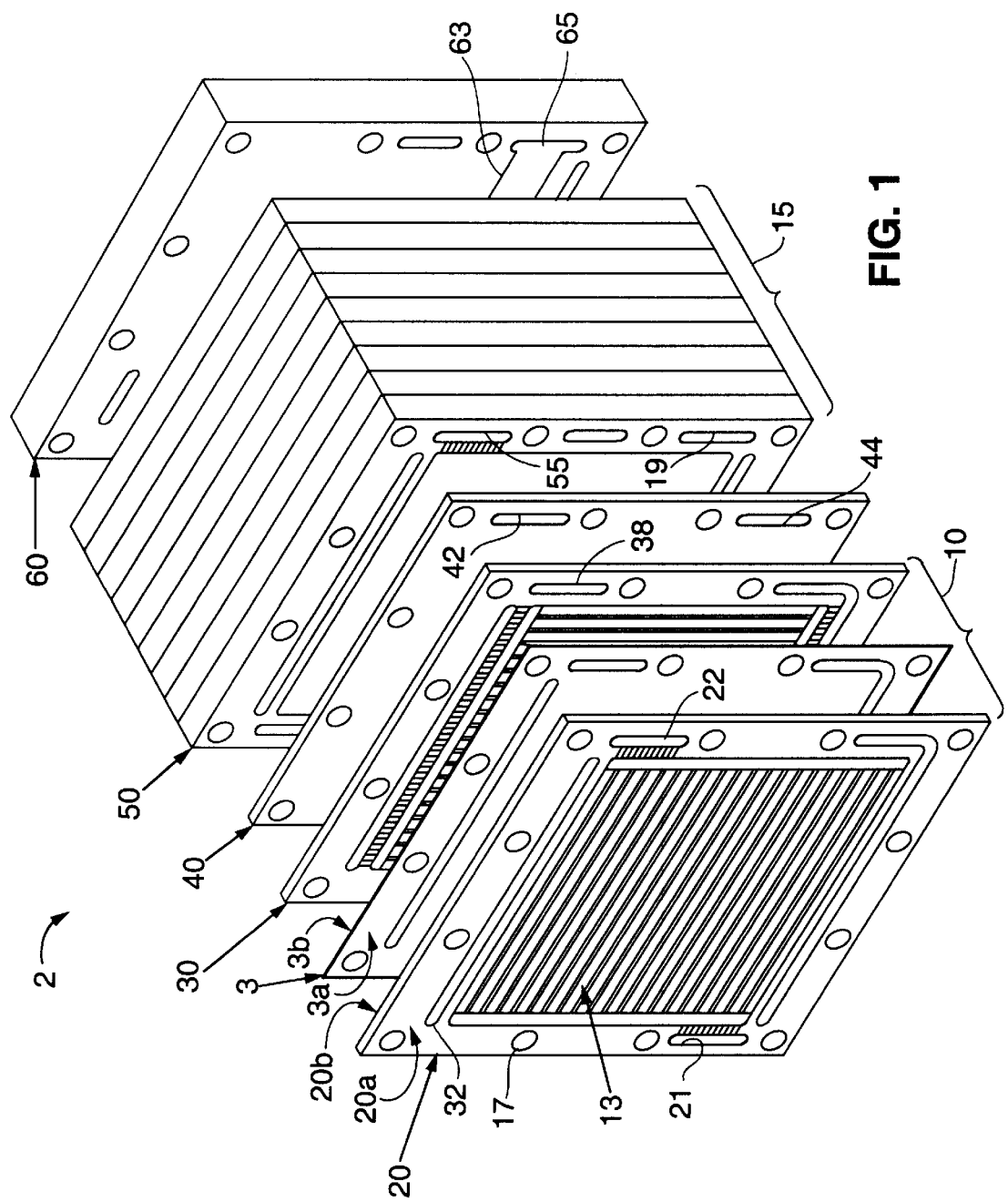
FIG. 1 shows an exploded isometric view of one embodiment of a fuel cell in accordance with the present invention.

FIG. 1 shows an exploded isometric view of a water-cooled PEM fuel cell in accordance with one embodiment of the present invention.

Fuel cell 2 utilizes a plate and frame approach, wherein active device elements are formed as a plate having a perimeter enclosed within a frame. The plates and frames are assembled as a parallel stack, with aligned bolt holes 17 receiving bolts to secure the frames together. As described in detail below, the frames of the various plates also include aligned manifolds permitting the free flow of gas between plates.

From front to back, fuel cell 2 features a humidification section 10, a divider plate 40, a power section 15, and a power section end plate 60. Humidification section 10 includes humidification membrane 3 sandwiched between a first (dry-side) humidification plate 20 and a second (wet-side) humidification plate 30.

Power section 15 is made up of a series of repeating units 50. The structure of power section 15 is discussed below in detail in conjunction with FIG. 5.

Alignment of the plates and manifolds creates a first gas pathway extending from the inlet of the fuel cell through the first humidification plate and across the first side of the humidification membrane to the power section. Alignment of the plates and manifolds also creates a second gas pathway extending from the power section to the second humidification plate and across the second side of the humidification membrane to the outlet of the fuel cell.

During operation of fuel cell 2, dry, oxygen-rich air enters first humidification plate 20 through inlet manifold 21 and is conveyed across flow field 13 of humidification plate 20 in contact with first (dry) side 3a of humidification membrane 3. During this passage, the inlet air absorbs moisture from humidification membrane 3.

The moistened inlet air then exits first humidification plate 20 via manifold 22 and is conveyed through manifold 38 of second humidification plate 30 and manifold 42 of divider plate 40 to power section 15.

In power section 15, the moist inlet air undergoes reaction with hydrogen to produce electricity.

Wet, oxygen-depleted exhaust air exits power section 15 and is conveyed across cross-over slot 63 of endplate 60 back through manifold 19 of power section 15 and manifold 44 of divider plate 40 to second humidification plate 30. At second humidification plate 30, exhaust air contacts a second (wet) side 3b of humidification membrane 3. After surrendering moisture to second side 3b of humidification membrane 3, the exhaust air is output from fuel cell 2 through exhaust manifold 32.

For purposes of illustration, a simplified view of humidification section 10 is depicted in FIG. 1. Specifically, humidification section 10 could actually consist of a series of humidification membranes sandwiched between alternating dry-and wet-side humidification plates. Thus in FIG. 1, flow field 13 of first, dry-side humidification plate 20 is shown facing away from humidification membrane 3. Although not evident from FIG. 1, humidification plate 20 actually includes a flow field on both sides, and flow field 13 of FIG. 1 would contact a second humidification membrane (not shown) positioned in front of first humidification 20.

Humidification membrane 3 may be formed from a variety of materials, including ionomer membranes. One such material is a GORE-SELECT® membrane having a thickness of approximately twenty :m, as manufactured by W. L. Gore and Associates. The GORE-SELECT® material consists of Dupont NAFION® ion exchange material applied to a substrate of expanded TEFLON® (i.e., GORE-TEX®). This substrate provides mechanical strength, allowing the active moisture-exchange layer to be thin and efficient. The thinness of the membrane in active humidification areas translates directly into improved performance of the humidification membrane in transporting water relative to a plain sheet of NAFION®.

The structure and operation of fuel cell 2 is now discussed in detail in connection with FIGS. 2–6.

Figure 2:
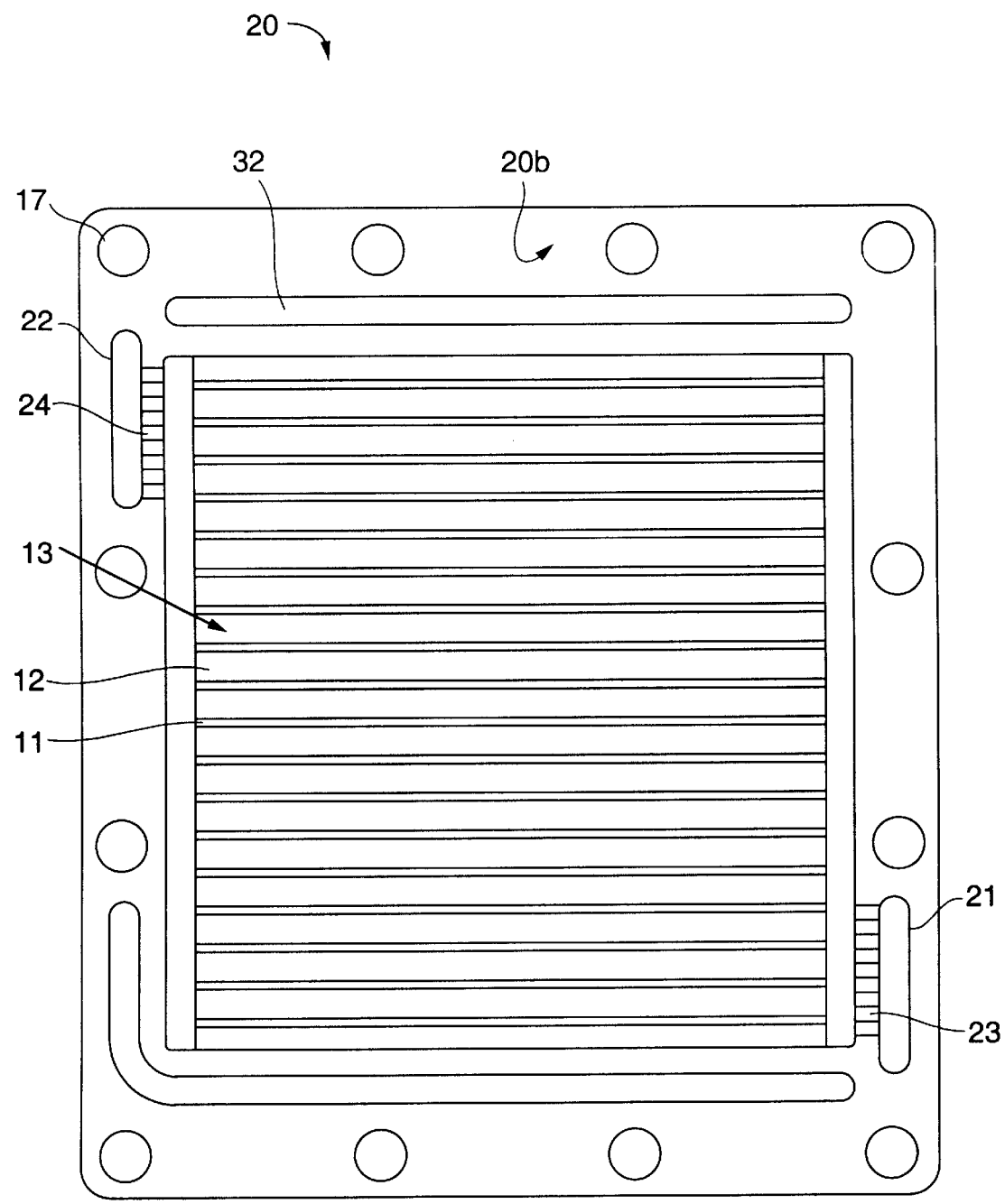
FIG. 2 shows a plan view of a first (dry-side) humidification plate of the fuel cell of FIG. 1.

As shown in FIG. 1, first humidification plate 20 has a first (visible) side 20a and a second side 20b in contact with the dry-side 3b of humidification membrane 3. FIG. 2 shows a plan view of second side 20b of plate 20. Dry air enters fuel cell 2 at humidification section 10 through inlet manifold 21. The dry inlet air passes through inlet channels 23 and is conveyed across the humidification membrane by flow field 13 including channels 12 separated by raised lands 11. During this passage, the inlet air gains moisture from the humidification membrane before exiting through outlet channels 24 to outlet manifold 22.

Figure 3:
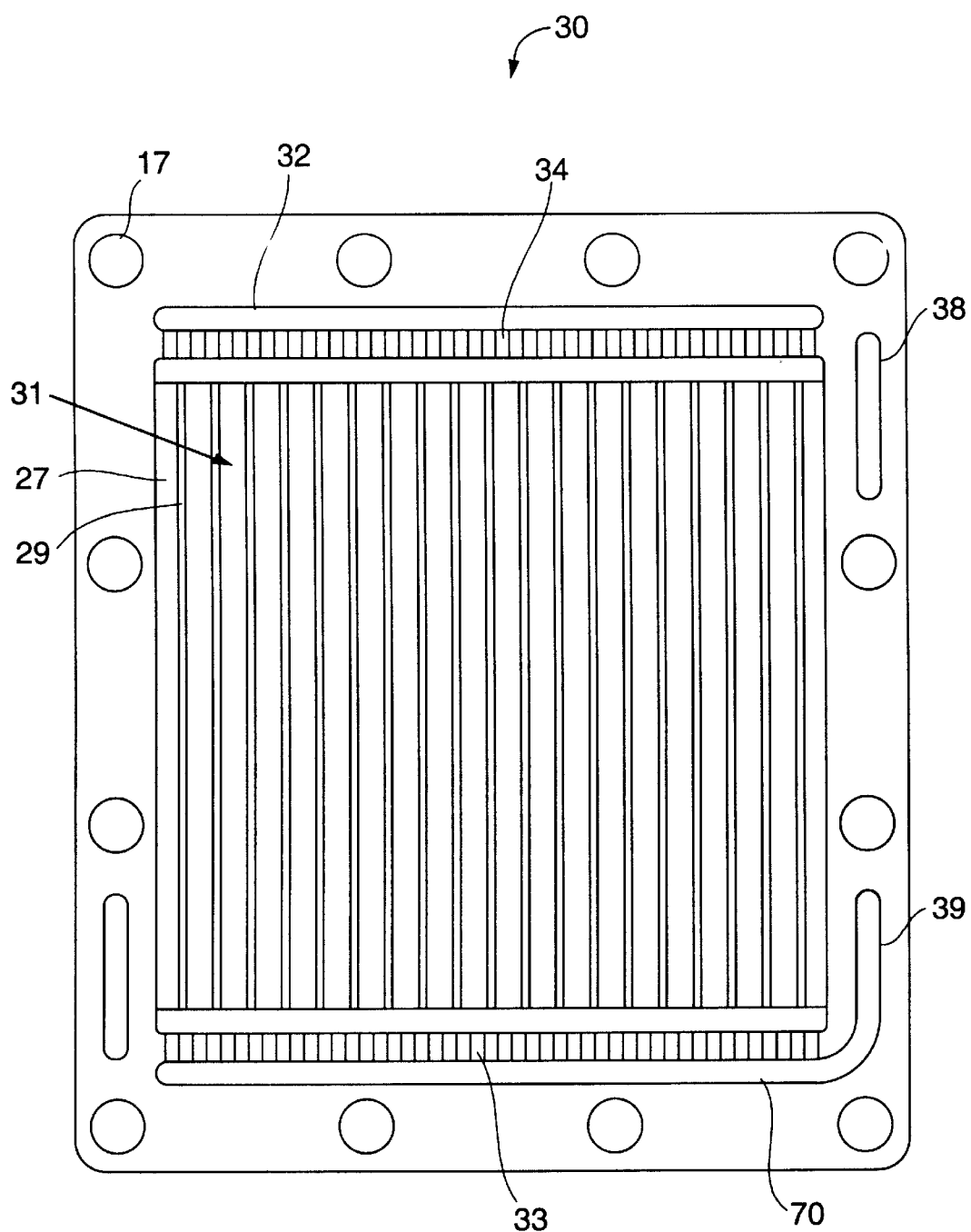
FIG. 3 shows a plan view of a second (wet-side) humidification plate of the fuel cell of FIG. 1.

FIG. 3 shows a plan view of second humidification plate 30. At this point in the air flow, humidified air from first humidification plate 20 simply passes unaltered through manifold 38. Second humidification plate 30 is further described below.

Figure 4:
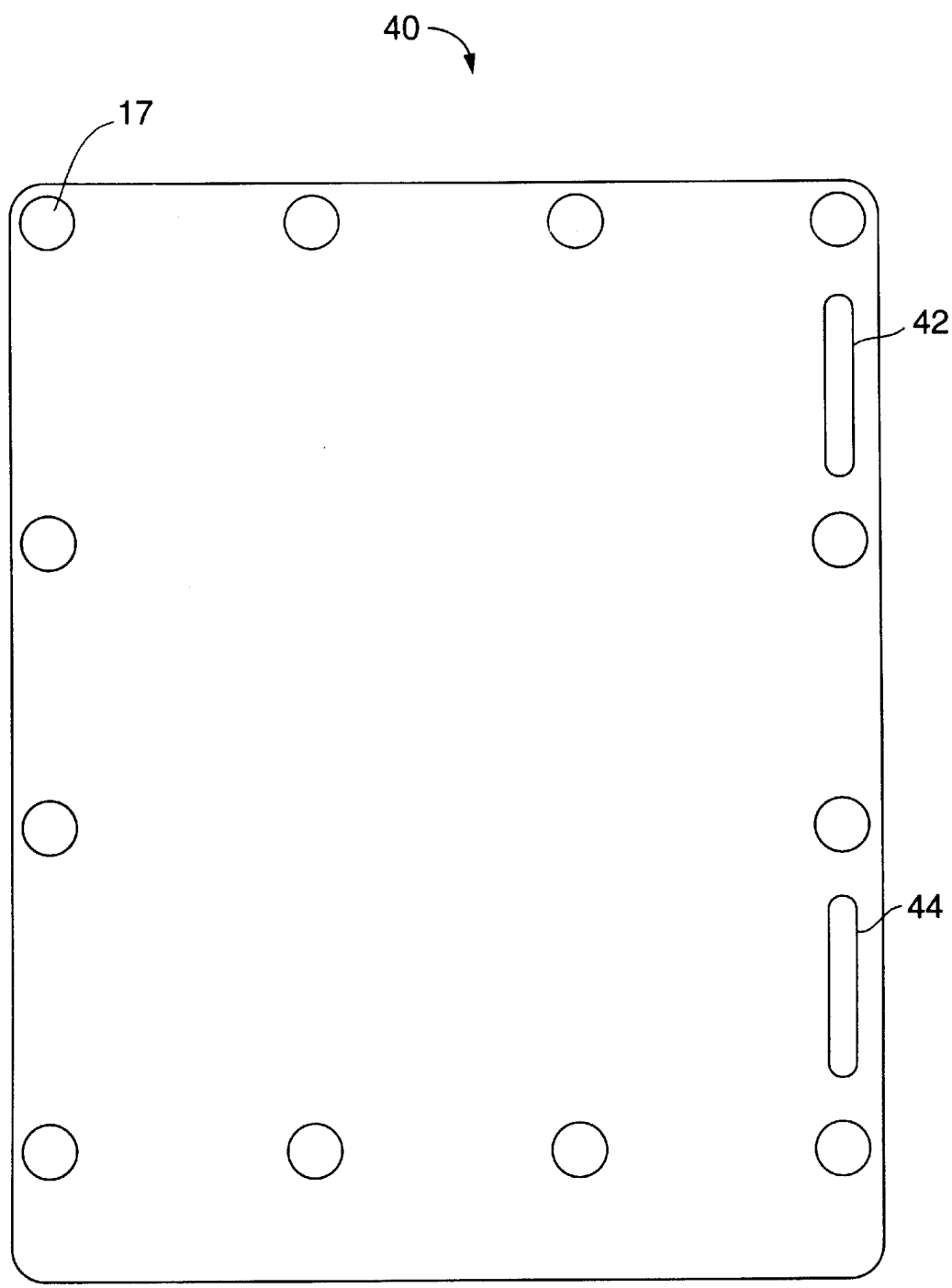
FIG. 4 shows a plan view of a divider plate of the cell of FIG. 1.

FIG. 4 shows a plan view of divider plate 40. Divider plate 40 serves to physically separate the humidification section from the power section of the fuel cell. Divider plate 40 may also serve as a bus plate for the fuel cell. The humidified inlet air passes through manifold 42 of divider plate 40 unaltered.

Figure 5:
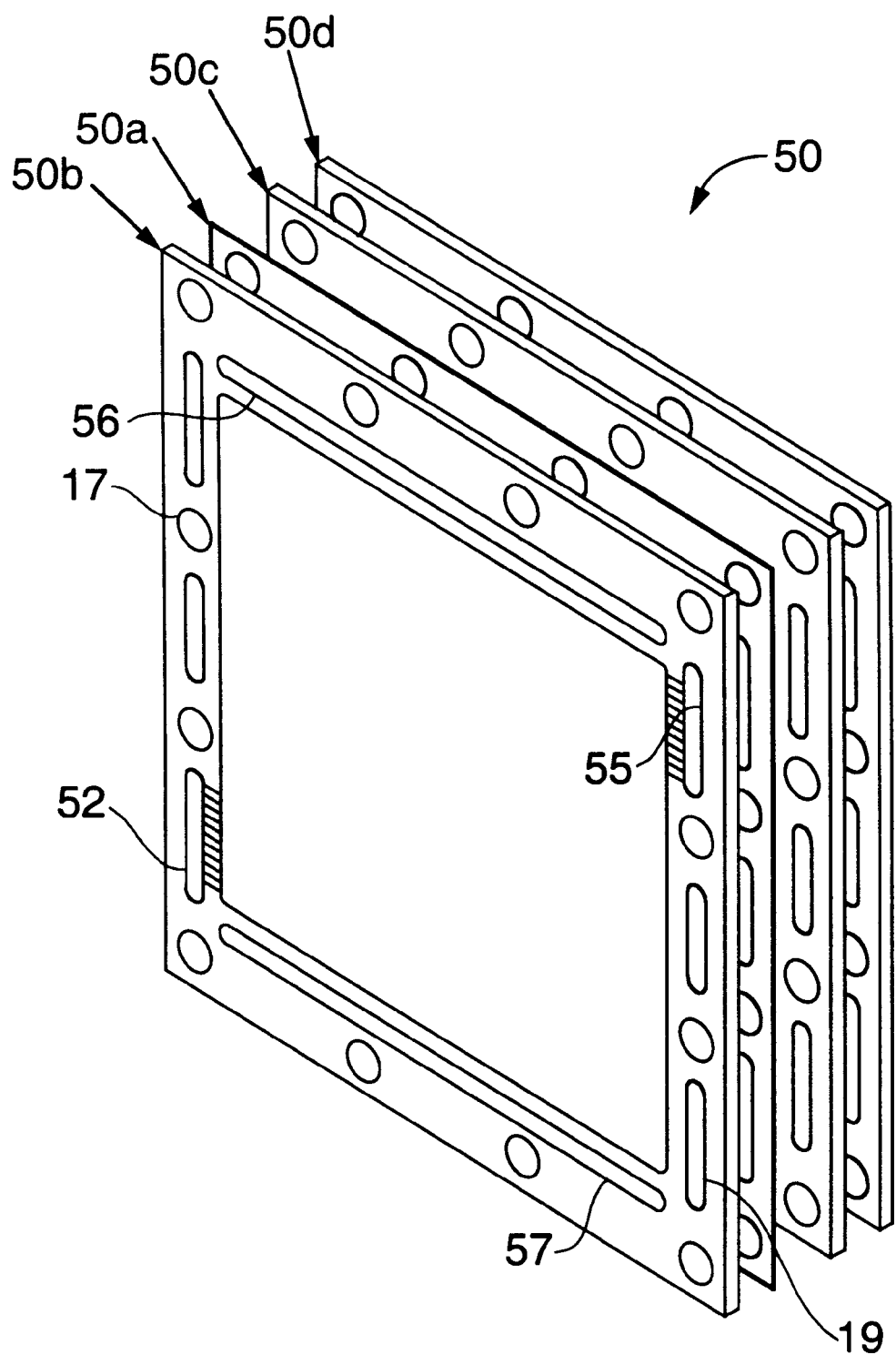
FIG. 5 shows an exploded isometric view of one repeated element of a power section of the fuel cell of FIG. 1.

As shown in FIG. 1, power section 15 is made up of a series of repeating units 50. FIG. 5 shows an exploded isometric view of one such repeated unit 50, which also utilizes the plate and frame configuration of the humidification section. Repeated power section unit 50 is made up of proton exchange membrane 50a sandwiched between air diffuser plate 50b and a hydrogen diffuser plate 50c.

Air diffuser plate 50b, the back of which is shown in FIG. 5, passes the inlet air flow across a flow field in contact with a first side of proton exchange membrane 50a. Air diffuser plate 50b receives the flow of inlet air at manifold 55 and passes this air flow to manifold 52.

Hydrogen diffuser plate 50c is positioned on the side of proton exchange membrane 50a opposite to air diffuser plate 50b. Hydrogen diffuser plate 50c receives a concentration of hydrogen gas and passes this hydrogen gas across a flow field in contact with a second side of the proton exchange membrane 50a, thereby causing the electrochemical reaction to occur. This electrochemical reaction removes oxygen from, and introduces water into, the air, thereby transforming the inlet air flow into a moisture-containing exhaust air flow.

Cooling plate 50d is positioned at the end of each repeated power section unit 50. Cooling plate 50d receives a flow of liquid coolant under pressure, such as water or antifreeze, thereby maintaining the fuel cell at a relatively constant temperature optimum for operation. Where the fuel cell is air cooled, cooling plate 50d is replaced by a spacer plate that physically segregates repeated power section units 50.

Because the temperature in power section 15 is higher than in humidification section 10 due to the exothermicity of the electrochemical reaction, the air flow in power section 15 is humid but not fully saturated with water. Thus, the air flow is able to evaporate enough water produced by the electrochemical reaction to prevent flooding of the flow field of air diffuser plate 50b. The moist, oxygen-depleted outlet air then eventually exits power section 15 through a manifold positioned on the back side of cooling plate 50d.

Figure 6:
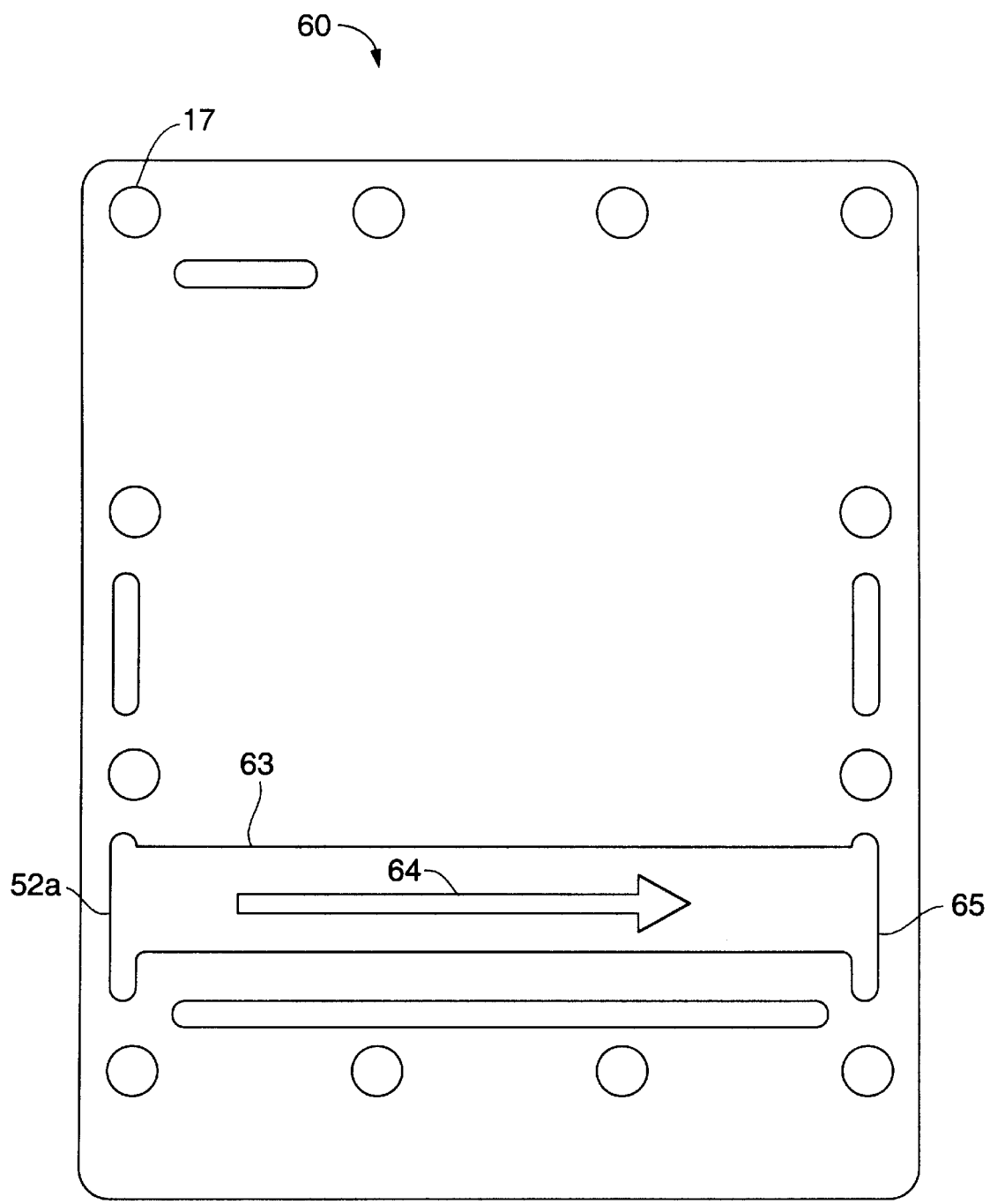
FIG. 6 shows a plan view of the power section end plate of the fuel cell of FIG. 1.

FIG. 6 shows a plan view of power section end plate 60 of fuel cell 2. At end plate 60, manifold 52a and air return manifold 65 are joined by cross-over slot 63. Moist, oxygen-depleted exhaust air flows across slot 63 in the direction of arrow 64, and is returned to second humidification plate 30 through manifold 19 in power section 15 and manifold 44 in divider plate 30. The exhaust air is maintained at a nearly constant temperature to minimize condensation during this stage in the air flow.

Returning now to FIG. 3, second humidification plate 30 is in contact with the second, wet-side of the humidification membrane. Manifold 39 of second humidification plate 30 is joined with manifold 70. The moist outlet air passes from manifold 70 through inlet channels 33 to traverse flow field 31 in contact with the second side of the humidification membrane. Flow field 31 includes channels 27 separated by lands 29. During this process, the moist exhaust air gives up a part of its moisture to the humidification membrane before exiting through outlet channels 34. Oxygen- and moisture-depleted exhaust is then output into the atmosphere through exhaust manifold 32.

The structure and process of the present invention described above offer a number of important advantages over conventional fuel cell humidification structures and methods.

One important advantage is that operation of the humidification system does not interfere with the supply of oxygen to the fuel cell. Unlike the system disclosed by the '910 Patent, the inlet air flow is exposed only to water exchanged through the humidification membrane. The humidification membrane acts as a barrier to prevent diffusion of oxygen from the oxygen-rich inlet air flow to the oxygen-depleted outlet air flow, thereby preventing the fuel cell from experiencing a power loss attributable to depletion of inlet oxygen.

Another advantage of the present invention is segregation of humidification and cooling functions of the fuel cell. Because humidification is provided entirely by the inlet airflow, a liquid water flow need be incorporated within the fuel cell only if required for cooling purposes. Moreover, because contact between the coolant and the proton exchange membrane is not required, antifreeze can be utilized by the cooling plate to provide freeze protection for the cell. This feature is particularly important where the fuel cell will be routinely exposed to subfreezing temperatures, for example as a power supply for a vehicle operated in cold-weather regions.

Design and fabrication of the fuel cell is also facilitated utilizing the present design. Construction of the humidification cell plates is greatly simplified by eliminating the flow of liquid water against the thin and fragile humidification membrane. Moreover, because the fuel cell is designed to operate with low air pressures (approximately atmospheric), no gaskets or special seals are required to permit air humidification in accordance with the present invention.

A further advantage of the fuel cell in accordance with the present invention is its passive operation. Humidification is accomplished through the natural flow of air through the fuel cell. No active controlling elements such as a valve or central processing unit are required. This approach eliminates issues relating to calibration, maintenance, and replacement of such active humidification components.

Although the present invention has so far been described in conjunction with the specific embodiment shown in FIGS. 1–6, the invention is not limited to this particular embodiment. Various modifications and alterations in the process will be apparent to those skilled in the art without departing from the scope of the present invention.

For example, while FIGS. 1–6 depict a water-cooled PEM fuel cell, this is not required by the present invention. An air-cooled PEM fuel cell would also fall within the scope of the present invention. In such an alternative embodiment, the cooling plate at the end of each power unit would simply be replaced with a spacer plate having properly aligned manifolds and bolt holes. Temperature control for the fuel cell would be provided by the flow of inlet air and/or the use of an external air flow over and around the fuel cell.

In addition, while FIGS. 1–6 depict a fuel cell supplied by air, this is also not required by the present invention. Humidification of a fuel cell supplied by oxygen or some other oxidizing gas would also fall within the scope of the present invention.

Given the above detailed description of the invention and the variety of embodiments described therein, it is intended that the following claims define the scope of the present invention, and that apparatuses and methods within the scope of these claims and their equivalents be covered hereby.

What is claimed is:

1. A fuel cell comprising:
   an inlet configured to receive an inlet oxidant gas flow;
   a humidification membrane including a first side and a second side, the first side of the humidification membrane in communication with the inlet;
   a power section configured to receive the inlet oxidant gas flow from the first side of the humidification membrane and to pass the inlet oxidant gas flow across a first side of a proton exchange membrane to create an exhaust gas flow enriched in water vapor, the first side of the proton exchange membrane in communication with the second side of the humidification membrane such that water vapor from the exhaust gas flow is transferred across the humidification membrane to the inlet oxidant gas flow; and
   an outlet configured to convey the exhaust gas flow out of the fuel cell.

2. A fuel cell according to claim 1 further comprising:
   a first humidification plate configured to receive the inlet oxidant gas flow from the inlet and to pass the inlet oxidant gas flow across the first side of the humidification membrane to the power section; and
   a second humidification plate configured to receive the exhaust gas flow from the power section and to pass the exhaust gas flow across the second side of the humidification membrane to the outlet.

3. A fuel cell according to claim 2 further comprising:
   a first frame enclosing a perimeter of the first humidification plate, the first frame including a first manifold in communication with the inlet across the first side of the humidification membrane;
   a second frame enclosing a perimeter of the second humidfication plate, the second frame including a second manifold in communication with the first manifold, the second frame also including a third manifold in communication with the outlet across the second side of the humidification membrane; and
   a third frame enclosing a perimeter of the power section, the third frame including a fourth manifold in communication with the second manifold, the third frame also including a fifth manifold in communication with the third manifold, the fourth manifold in communication with the fifth manifold across the first side of the proton exchange membrane.

4. A fuel cell according to claim 2 wherein:
   the first humidification plate includes a flow field in contact with the first side of the humidification membrane, the flow field including a plurality of channels in communication with the inlet and with the first manifold, the channels separated by raised lands; and
   the second humidification plate includes a flow field in contact with the second side of the humidification membrane, the flow field including a plurality of channels in communication with the third manifold and with the outlet, the channels separated by raised lands.

5. A fuel cell according to claim 1 wherein the power section comprises:
   the proton exchange membrane;
   an air diffuser plate configured to receive the inlet oxidant gas flow and to pass the inlet oxidant gas flow across the first side of the proton exchange membrane; and
   a hydrogen diffuser plate configured to receive an inlet flow of hydrogen gas and to pass the inlet hydrogen gas flow across a second side of the proton exchange membrane opposite the first side of the proton exchange membrane to create the exhaust gas flow.

6. A fuel cell according to claim 5 further comprising:
   a first frame enclosing a perimeter of the first humidification plate, the first frame including a first manifold in communication with the inlet across the first side of the humidification membrane;
   a second frame enclosing a perimeter of the second humidification plate, the second frame including a second manifold in communication with the first manifold, the second frame also including a third manifold in communication with the outlet across the second side of the humidification membrane; and
   a third frame enclosing a perimeter of the air diffuser plate, the third frame including a fourth manifold in communication with the second manifold, the third frame also including a fifth manifold in communication with the third manifold, the fourth manifold in communication with the fifth manifold across the first side of the proton exchange membrane.

7. A fuel cell according to claim 5 further comprising a spacer plate in contact with one of the air diffuser plate and the hydrogen diffuser plate, the spacer plate configured to receive a coolant to control a temperature of the fuel cell.

8. A fuel cell according to claim 1 wherein the humidification membrane comprises an ionomer membrane.

9. A fuel cell according to claim 1 further comprising a cooling plate in contact with the inlet air flow, the cooling plate configured to receive a coolant to control a temperature of the fuel cell.

10. A method for humidifying a fuel cell comprising the steps of:

contacting an inlet oxidant gas flow with a first side of a humidification membrane;

causing an electrochemical reaction to transform the inlet oxidant gas flow into a water vapor-containing exhaust gas flow once the inlet gas flow has contacted the first side of a proton exchange membrane; and contacting the exhaust gas flow with a second side of the humidification membrane, such that water vapor from the exhaust gas flow is transfered across the humidification membrane to the inlet oxidant gas flow.

11. A method according to claim 10, wherein the step of contacting an inlet oxidant gas flow with the humidification membrane comprises the step of contacting an inlet air flow with the humidification membrane.

12. A method according to claim 10, wherein the step of contacting an inlet oxidant gas flow with the humidification membrane comprises the step of contacting an inlet flow of oxygen gas with the humidification membrane.

13. A method according to claim 10, wherein the step of causing an electrochemical reaction to transform the inlet oxidant gas flow comprises contacting an inlet flow of air with protons conveyed across a proton exchange membrane from a concentration of hydrogen gas.

14. A method according to claim 10, wherein the step of causing an electrochemical reaction to transform the inlet oxidant gas flow comprises contacting an inlet flow of oxygen gas with protons conveyed across a proton exchange membrane from hydrogen gas.

* * * * *